(12) United States Patent
Karpelson et al.

(10) Patent No.: US 9,257,936 B2
(45) Date of Patent: Feb. 9, 2016

(54) SYSTEM AND METHOD FOR EFFICIENT DRIVE OF CAPACITIVE ACTUATORS WITH VOLTAGE AMPLIFICATION

(75) Inventors: Michael Karpelson, Newton, MA (US); Robert J Wood, Cambridge, MA (US); Gu-Yeon Wei, Boston, MA (US)

(73) Assignee: President and Fellows of Harvard College, Cambridge, MA (US)

( * ) Notice: Subject to any disclaimer, the term of this patent is extended or adjusted under 35 U.S.C. 154(b) by 243 days.

(21) Appl. No.: 14/236,437

(22) PCT Filed: Aug. 6, 2012

(86) PCT No.: PCT/US2012/049702
§ 371 (c)(1),
(2), (4) Date: Mar. 27, 2014

(87) PCT Pub. No.: WO2013/020127
PCT Pub. Date: Feb. 7, 2013

(65) Prior Publication Data
US 2014/0217930 A1    Aug. 7, 2014

Related U.S. Application Data

(60) Provisional application No. 61/514,934, filed on Aug. 4, 2011, provisional application No. 61/529,972, filed on Sep. 1, 2011.

(51) Int. Cl.
| | | |
|---|---|---|
| H02P 23/00 | (2006.01) |
| H02P 31/00 | (2006.01) |
| H02M 3/335 | (2006.01) |
| H02M 3/337 | (2006.01) |
| H02N 2/06 | (2006.01) |
| F02D 41/20 | (2006.01) |
| H02M 1/00 | (2007.01) |

(52) U.S. Cl.
CPC ............. *H02P 31/00* (2013.01); *H02M 3/3372* (2013.01); *H02M 3/33576* (2013.01); *H02N 2/06* (2013.01); *H02N 2/067* (2013.01); *F02D 41/2096* (2013.01); *F02D 2041/2013* (2013.01); *F02D 2041/2051* (2013.01); *H02M 2001/009* (2013.01)

(58) Field of Classification Search
CPC ...... H02P 25/04; D03D 49/44; G05D 3/1418; H02K 17/08; F04B 35/045
USPC .................................. 318/119, 800, 812, 813
See application file for complete search history.

(56) References Cited

U.S. PATENT DOCUMENTS

| | | | | |
|---|---|---|---|---|
| 5,075,600 A | * | 12/1991 | El-Hamamsy | H01G 5/14 315/227 R |
| 7,579,715 B2 | * | 8/2009 | Seelig | H02J 5/005 244/7 A |

(Continued)

*Primary Examiner* — Rina Duda
(74) *Attorney, Agent, or Firm* — Modern Times Legal

(57) ABSTRACT

A circuit for driving a plurality of capacitive actuators, the circuit having a low-voltage side, a high voltage side and a flyback transformer between the two. The low-voltage side comprises first and second pairs of low-side switches connected in series across an input voltage. The flyback transformer has a primary winding connected to the two pairs of switches. The high-voltage side has a pair of switches connected between the secondary winding of the flyback transformer and a ground and a plurality of capacitive loads and bidirectional switches to connect the loads to the secondary winding of the flyback transformer and a ground.

8 Claims, 9 Drawing Sheets

(56) References Cited

U.S. PATENT DOCUMENTS 7,932,777 B1 * 4/2011 Zipfel, Jr. .............. H02N 2/065
                                                    330/10

2011/0285330 A1 * 11/2011 Cewers ................ H02N 2/0075
                                                     318/116

* cited by examiner

SYSTEM AND METHOD FOR EFFICIENT DRIVE OF CAPACITIVE ACTUATORS WITH VOLTAGE AMPLIFICATION

CROSS-REFERENCE TO RELATED APPLICATIONS

The present application claims the benefit of the filing dates of U.S. Provisional Patent Application Ser. No. 61/514,934 filed by the present inventors on Aug. 4, 2011 and U.S. Provisional Patent Application Ser. No. 61/529,972 filed by the present inventors on Sep. 1, 2011.

The aforementioned provisional patent application is hereby incorporated by reference in its entirety.

STATEMENT REGARDING FEDERALLY SPONSORED RESEARCH OR DEVELOPMENT

This invention was made with government support under Grant Number CCF-0926148 awarded by the National Science Foundation. The government has certain rights in the invention.

BACKGROUND OF THE INVENTION

1. Field of the Invention

The present invention relates to capacitive actuators and more specifically to systems and methods for driving capacitive actuators.

2. Brief Description of the Related Art

Many actuation technologies, including piezoelectric actuators, electrostatic actuators, and dielectric elastomer actuators, have a capacitive nature. From an electrical perspective, these technologies present two important challenges. Firstly, since capacitive actuators rely on high electric fields or high electro-static pressure to operate, they generally require high drive voltages (tens to thousands of volts). Secondly, the capacitive structure of the actuators can store a large amount of electrical energy that is not converted into mechanical output; to increase system efficiency, it is highly desirable to recover this energy.

These challenges complicate power electronics design in actuation systems, particularly in mobile applications with power or weight constraints. Mobile devices are typically powered by a battery with limited capacity, which requires high efficiency to extend battery life. At the same time, the output voltage of the battery is typically much lower than the required drive voltage of capacitive actuators.

Switching-mode drive circuits are highly efficient electronic circuits which can be used, in appropriate configurations, to supply power to capacitive actuators, amplify the battery voltage to the level required by the actuators, and recover unused energy from the actuators. Such circuits typically consist of semiconductor switches, capacitors, and magnetic components (inductors and transformers). Due to the compact nature of semiconductor devices and surface-mount capacitors, inductors and transformers are frequently the heaviest and most expensive components of the drive circuits. To this end, it is desirable to minimize the number of magnetic components in a drive circuit, particularly in mobile applications. This is problematic in a system with several capacitive actuators. Typically, at least one magnetic component is required to step up the power supply (i.e. battery) voltage to a level required to drive the actuators, and one additional magnetic component per actuator is necessary to enable energy recovery.

An example of a prior art system is shown in U.S. Pat. No. 6,549,432 entitled "Single-Winding, Multiple Output, Bi-Directional Flyback Converter," which discloses a multiple-output bidirectional flyback converter. Such a converter would allow energy delivery from a low-voltage supply to several high-voltage loads, and from the loads back to the supply. The disclosed circuit, however, does not provide for transfer of energy directly from one load to another. To achieve such a transfer in that disclosed system, one would have to first transfer energy from a load to the supply, then from the supply to a different load. Two energy transfers instead of one results in additional losses and ties up the magnetic element for a longer time, which reduces the bandwidth of the drive circuit.

Another example of a prior art circuit system is shown in U.S. Pat. No. 7,199,503, entitled "Energy Saving Driving Circuit for Piezoelectric Motor," which discloses a circuit that can be used to drive two piezoelectric actuators at a voltage higher than the supply voltage, and also to transfer energy from one actuator to the other. However, this circuit uses multiple magnetic elements. Moreover, these elements are inductors, which can limit circuit efficiency in applications where a high voltage step-up ratio is required.

SUMMARY OF THE INVENTION

A circuit is presented that can be used to drive a number of capacitive actuators (or other types of capacitive loads) using only a single magnetic component, while simultaneously generating a drive voltage substantially greater than the power supply voltage. The circuit is especially well suited to systems where two or more actuators are driven in a cyclical manner. The drive circuit is capable of transferring energy from the power supply to any of the actuators, and also of recovering unused energy from certain actuators and transferring it to other actuators, or storing it for use in subsequent actuation cycles. Because the circuit can be applied to a number of capacitive actuators as well as other loads, such as energy storage capacitors, the general term "capacitive load" will be used from now on.

The drive circuit is relevant to any application which involves cyclical energy transfer between two or more capacitive loads. Examples include:
Piezoelectric positioning systems;
Piezoelectrically driven optics;
Piezoelectric fuel injection systems;
Antagonistic actuators in robotics; and
Artificial muscle.

A number of switching drive circuits applicable to capacitive loads, and particularly piezoelectric actuators, exist in prior art. To our knowledge, the present drive circuit is the only one capable of recovering energy from multiple capacitive loads using a single magnetic component, while also using the same magnetic component to generate drive voltages that are substantially greater than the power supply voltage. The use of a single magnetic component has the potential to reduce system cost, weight, and dimensions, while maximizing system efficiency by recovering unused energy from the capacitive loads. These qualities make the drive circuit especially attractive for mobile and embedded systems, as well as any weight and power-critical designs.

In a preferred embodiment, the present invention is a circuit for driving a plurality of capacitive actuators. The circuit comprises a low-voltage side, a high voltage side and a flyback transformer between the two. The low-voltage side comprises first and second pairs of low-side switches, with the first pair comprising switches $Q_1$ and $Q_3$ connected in series across the input voltage and the second pair comprising switches $Q_2$ and $Q_4$ connected in series across the input voltage, as well as low-side control logic connected to the low-side switches $Q_1$, $Q_2$, $Q_3$ and $Q_4$ for controlling the low-side switches $Q_1$, $Q_2$, $Q_3$ and $Q_4$. The flyback transformer has a primary winding connected on a first end between the switches $Q_1$ and $Q_3$ and connected on a second end between the switches $Q_2$ and $Q_4$. The high-voltage side comprises a switch $Q_5$ connected between a first end of a secondary winding of the flyback transformer and a ground, a capacitive load $C_{A0}$, a bidirectional switch $Q_{A0}$ connected in series with the capacitive load $C_{A0}$. When the bidirectional switch $Q_{A0}$ is closed, the capacitive load $C_{A0}$ is connected between the first end of the secondary winding of the flyback transformer and a ground. The high-voltage side further comprises a switch $Q_6$ connected between a second end of a secondary winding of the flyback transformer and a ground, a capacitive load $C_{B0}$ and a bidirectional switch $Q_{B0}$ connected in series with the capacitive load $C_{B0}$. When the bidirectional switch $Q_{B0}$ is closed, the capacitive load $C_{B0}$ is connected between the second end of the secondary winding of the flyback transformer and a ground. The high-voltage side further comprises control logic connected to the switches $Q_5$, $Q_6$, $Q_{A0}$ and $Q_{B0}$ for controlling the switches $Q_5$, $Q_6$, $Q_{A0}$ and $Q_{B0}$. The high-voltage side may further comprise a resistive divider associated with each capacitive load to permit the high side control logic to monitor voltages across the capacitive loads.

The high-voltage side may further comprise an arbitrary number of capacitive loads $C_{A1}$ through $C_{AN}$ and associated switches $Q_{A1}$ through $Q_{AN}$, connected in the same manner as $C_{A0}$ and $Q_{A0}$. The high-voltage side may further comprise an arbitrary number of capacitive loads $C_{B0}$ through $C_{BN}$ and associated switches $Q_{B1}$ through $Q_{BN}$, connected in the same manner as $C_{B0}$ and $Q_{B0}$. The switches $Q_{A1}$ through $Q_{AN}$ and $Q_{B1}$ through $Q_{BN}$ may be controlled by the high-side control logic.

In another embodiment, the high-voltage side may further comprise a bidirectional switch $Q_{A0'}$ connected in series with the capacitive load $C_{A0}$ and a bidirectional switch $Q_{B0'}$ connected in series with the capacitive load $C_{B0}$. When the bidirectional switch $Q_{A0'}$ is closed the capacitive load $C_{A0}$ is connected between the second end of the secondary winding of the flyback transformer and a ground. When the bidirectional switch $Q_{B0'}$ is closed the capacitive load $C_{B0}$ is connected between the first end of the secondary winding of the flyback transformer and a ground. The high-voltage side may further comprise an arbitrary number of bidirectional switches $Q_{A1'}$ through $Q_{AN'}$ and $Q_{B1'}$ through $Q_{BN'}$, connected in a similar convention as $Q_{A0'}$ and $Q_{B0'}$, respectively.

In yet another embodiment, the present invention comprises a method for controlling the switches of the circuit to transfer energy from the power supply to any one of a plurality of capacitive loads that may be connected to the circuit and from any one such load to any other such load.

In another preferred embodiment, the present invention is a method for driving multiple capacitive actuators. The method comprises the steps of applying a first voltage $V_{ss}$ across a primary winding of a flyback transformer to store a quantity of energy in a magnetic field of said flyback transformer, disconnecting said first voltage $V_{ss}$ from said primary winding of said flyback transformer, providing a current path from ground to a first capacitive load through the secondary winding of said flyback transformer, delivering energy from said secondary winding of said flyback transformer to said first capacitive load, transferring energy from said first capacitive load to said flyback transformer via the secondary winding of said flyback transformer, providing a current path from ground to a second capacitive load through said secondary winding of said flyback transformer, delivering energy from said secondary winding of said flyback transformer to said second capacitive load, and repeating the above steps in an appropriate sequence to generate arbitrary voltages that can be substantially higher than said first voltage $V_{ss}$ across said first capacitive load, said second capacitive load, and multiple other capacitive loads as required by the application.

The method may be performed using a circuit having low-side control logic and high-side control logic that generate drive voltages having different phases and waveforms across multiple capacitive loads. The method may further comprise the steps of monitoring the voltages across said capacitive loads, using a first first-in-first-out (FIFO) memory element to record capacitive loads where the voltage must be reduced (i.e. capacitive loads with excess energy), using a second FIFO memory element to record capacitive loads where the voltage must be increased (i.e. capacitive loads requiring energy), initiating an energy transfer from the capacitive load recorded on the output of said first FIFO memory element to the capacitive load recorded on the output of said second FIFO memory element, and subsequently removing the records of said capacitive loads from said FIFO memory elements, initiating an energy transfer from the capacitive load recorded on the output of said first FIFO memory element to an energy storage capacitor when said second FIFO memory element does not contain any entries, and subsequently removing the record of said capacitive load from said first FIFO memory element, initiating an energy transfer from said energy storage capacitor to the capacitive load recorded on the output of said second FIFO memory element when said first FIFO memory element does not contain any entries, and subsequently removing the record of said capacitive load from said second FIFO memory element, and initiating an energy transfer from said input voltage $V_{ss}$ to the capacitive load recorded on the output of said second FIFO memory element when said first FIFO memory element does not contain any entries and when said energy storage capacitor does not contain any energy, and subsequently removing the record of said capacitive load from said second FIFO memory element.

Still other aspects, features, and advantages of the present invention are readily apparent from the following detailed description, simply by illustrating preferable embodiments and implementations. The present invention is also capable of other and different embodiments and its several details can be modified in various obvious respects, all without departing from the spirit and scope of the present invention. Accordingly, the drawings and descriptions are to be regarded as illustrative in nature, and not as restrictive. Additional objects and advantages of the invention will be set forth in part in the description which follows and in part will be obvious from the description, or may be learned by practice of the invention.

BRIEF DESCRIPTION OF THE DRAWINGS

For a more complete understanding of the present invention and the advantages thereof, reference is now made to the following description and the accompanying drawings, in which.

DETAILED DESCRIPTION OF THE PREFERRED EMBODIMENTS

Figure 1:
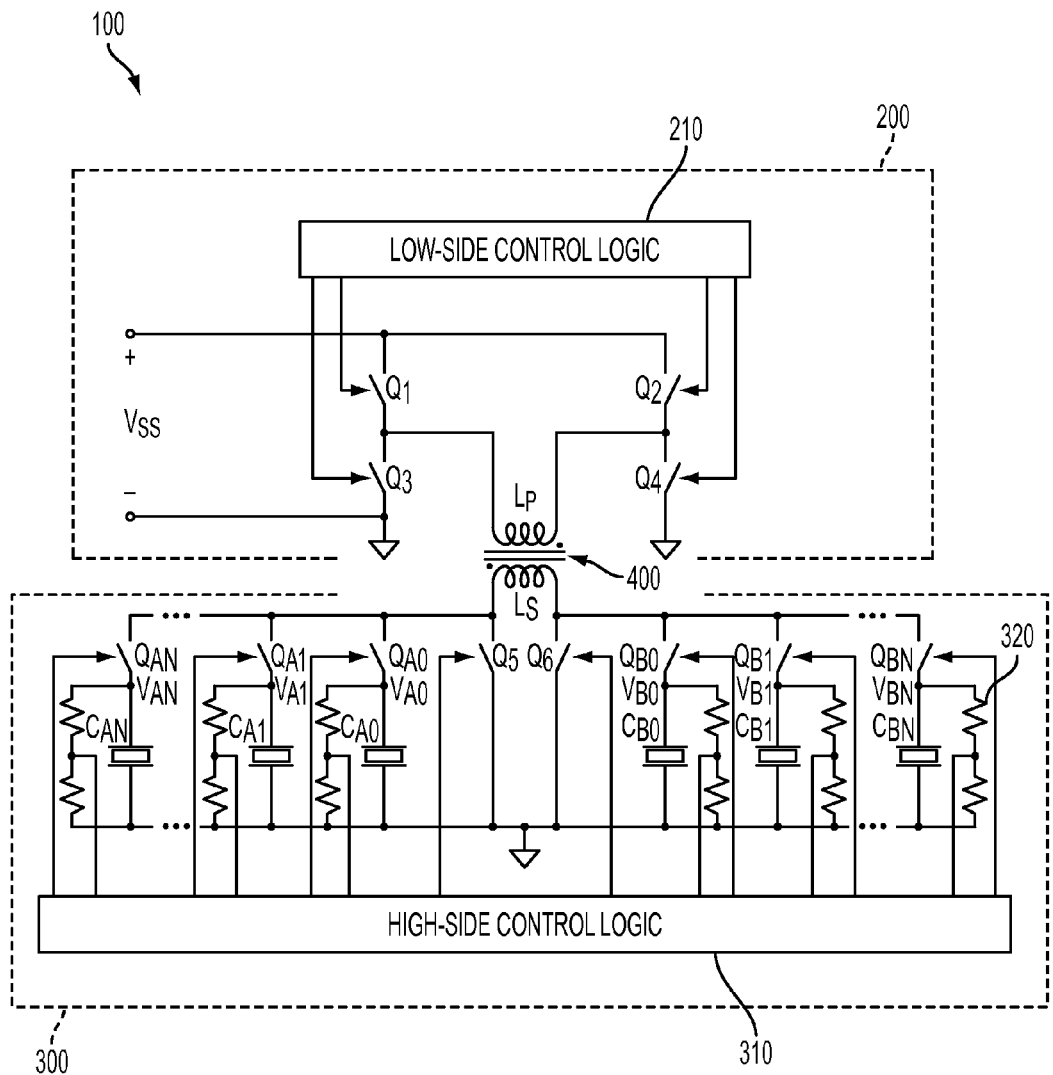
FIG. 1 is a schematic diagram of a circuit with step-up functionality applicable to multiple cyclically driven capacitive loads in accordance with a preferred embodiment of the present invention.

A preferred embodiment of a switching circuit 100 for cyclically driven capacitive loads is shown in FIG. 1. The circuit 100 has a low-voltage side 200 and a high-voltage side 300. The low-voltage side 200 comprises power supply $V_{ss}$, switches $Q_1$ through $Q_4$ and associated control logic 210. The high-voltage side 300 comprises switches $Q_5$ and $Q_6$, bidirectional switches $Q_{A0}$ through $Q_{AN}$ and $Q_{B0}$ through $Q_{BN}$, high-voltage capacitive loads $C_{A0}$ through $C_{AN}$ and $C_{B0}$ through $C_{BN}$, associated control logic 310, and a set of resistive dividers 320 to allow control logic 310 to monitor the voltages across the capacitive loads $C_{A0}$ through $C_{AN}$ and $C_{B0}$ through $C_{BN}$. The low-voltage side 200 and high-voltage side 300 are linked with a flyback transformer 400, represented by coupled inductances $L_P$ and $L_S$.

The capacitive loads $C_{A0}$ through $C_{AN}$ and $C_{B0}$ through $C_{BN}$ can represent capacitive actuators (such as piezoelectric, electrostatic, or dielectric elastomer actuators), or energy storage capacitors. These capacitive loads are driven with voltages that can be substantially greater than the voltage provided by power supply $V_{ss}$. By appropriately modulating the low-side and high-side switches Q, it is possible to use the flyback transformer 400 to transfer energy from the power supply $V_{ss}$ to any of the high-voltage capacitive loads $C_A$ or $C_B$. The use of a flyback transformer, as opposed to an inductor, can result in increased efficiency in applications where a high voltage step-up ratio is necessary. In a similar manner, it is also possible to transfer energy from any of the loads $C_A$ to any of the loads $C_B$ and vice-versa. If some of the capacitive loads are capacitors used for temporary energy storage, it becomes possible to transfer energy between any two loads C by using the capacitors as an intermediate storage point. In this way, unused electrical energy in the capacitive loads can be recovered and transferred to a different capacitive load, thereby reducing the power consumption of the entire system.

Figure 2A:
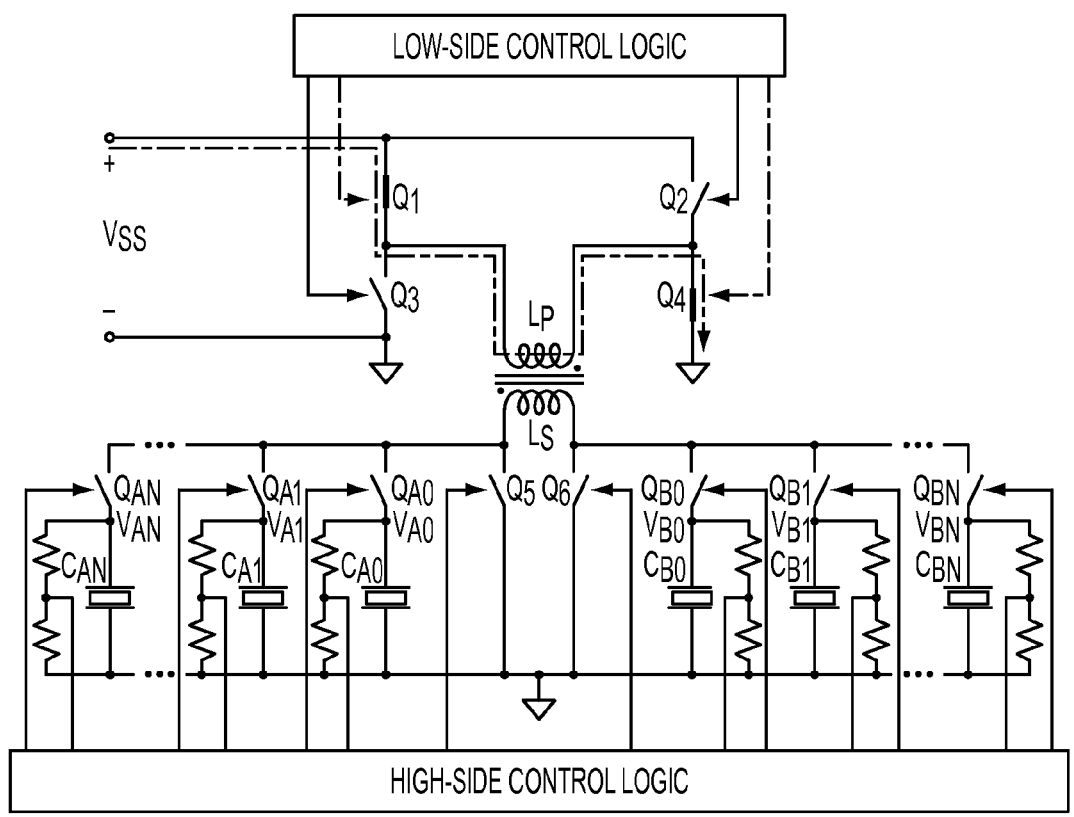
FIGS. 2A and 2B are schematic diagrams of a circuit in accordance with a preferred embodiment of the present invention illustrating transfer of energy from the power supply to load $A_0$. Energy is stored in the flyback transformer by closing switches $Q_1$ and $Q_4$ as shown in FIG. 2A and delivered to $C_{A0}$ by closing switches $Q_6$ and $Q_{A0}$ as shown in FIG. 2B.
Figure 2B:
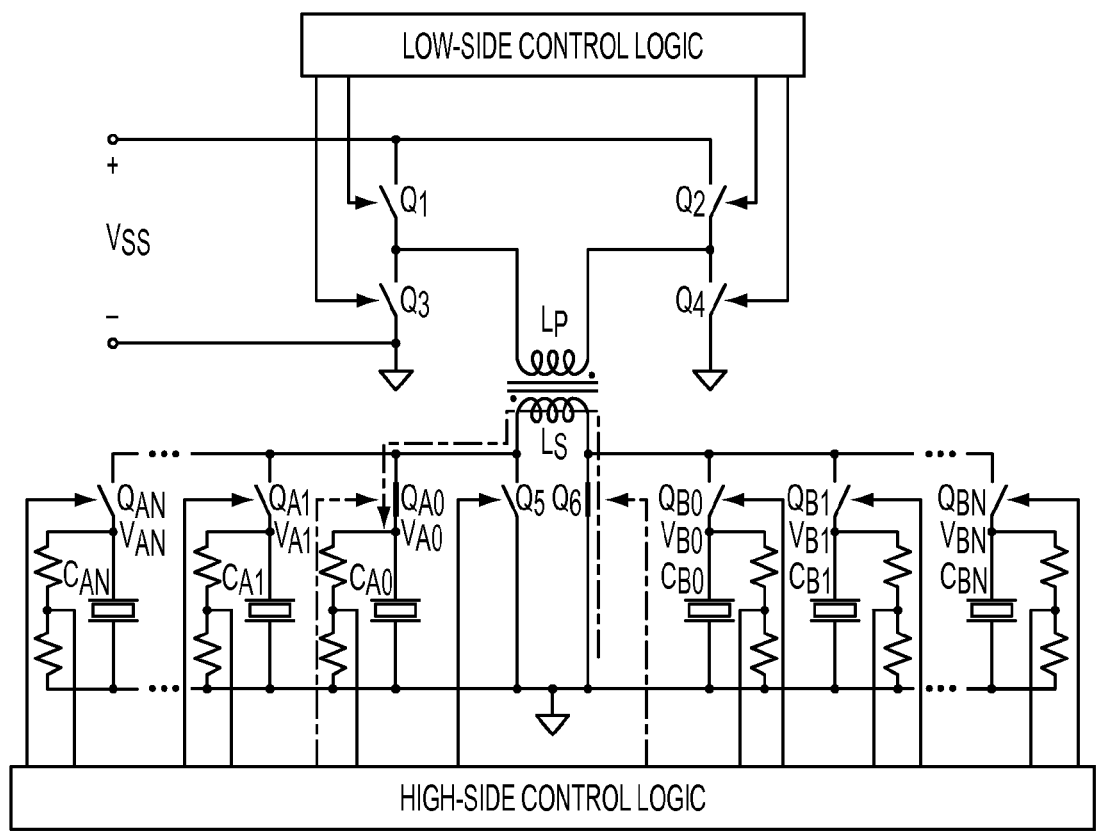
Figure 3A:
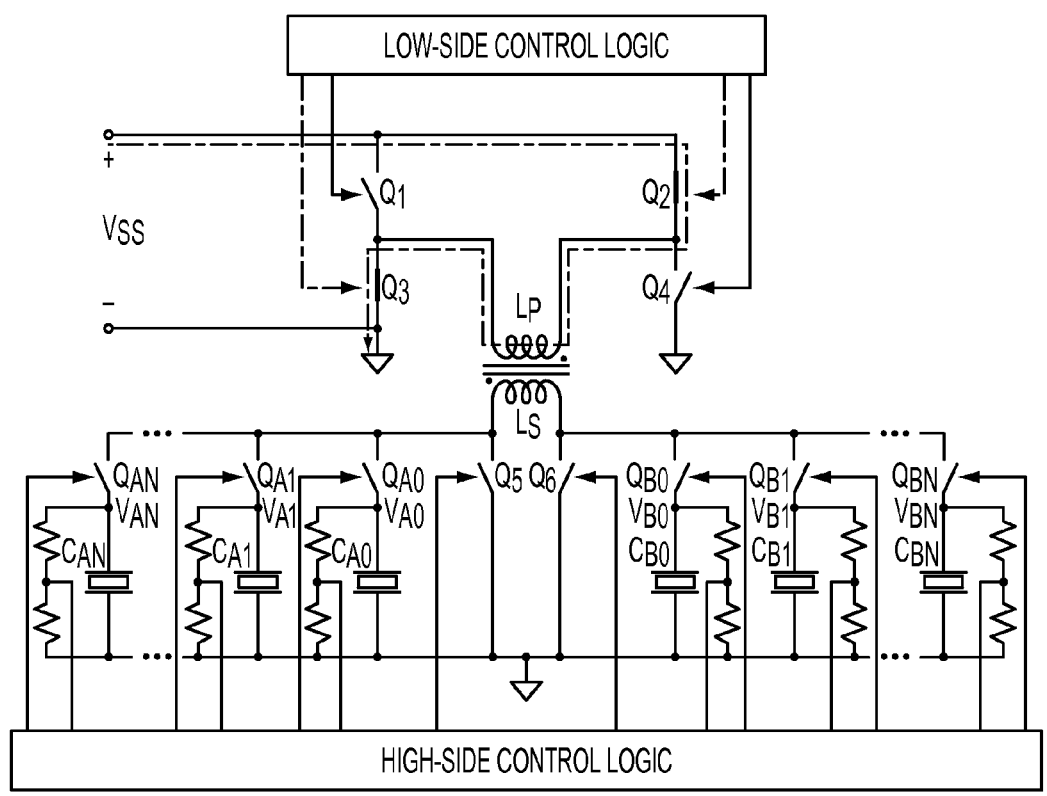
FIGS. 3A and 3B are schematic diagrams of a circuit in accordance with a preferred embodiment of the present invention illustrating transfer of energy from the power supply to load $B_0$. Energy is stored in the flyback transformer by closing switches $Q_2$ and $Q_3$ as shown in FIG. 3A and delivered to $C_{B0}$ by closing switches $Q_5$ and $Q_{B0}$ as shown in FIG. 2B.
Figure 3B:
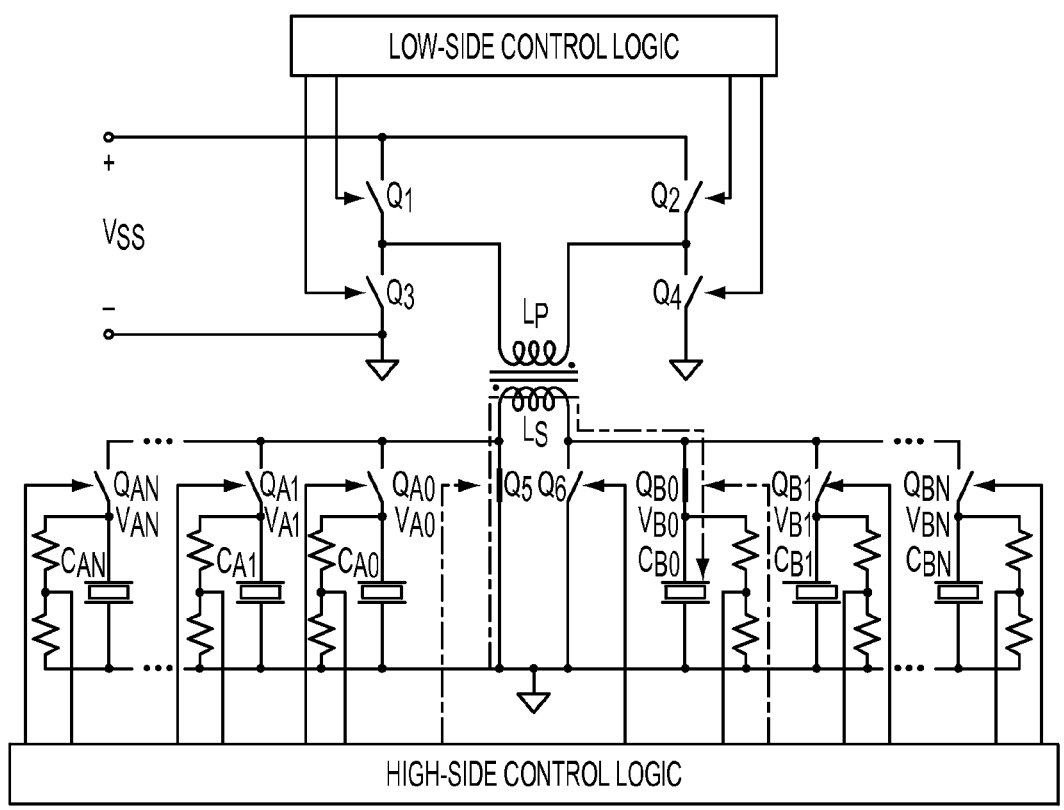

Three examples of energy transfer using the circuit shown in FIG. 1 are shown in FIGS. 2-4. In the cases of energy transfer from the power supply $V_{ss}$, either switches $Q_1$ and $Q_4$ (see FIG. 2A) or switches $Q_2$ and $Q_3$ (see FIG. 3A) are closed simultaneously, thereby applying a positive voltage $V_{ss}$ or a negative voltage $-V_{ss}$ across the flyback transformer 400 primary winding $L_P$. This has the effect of storing a quantity of energy in the magnetic field of the flyback transformer; the quantity depends on the length time of time that the switches are closed. Immediately after the low-side switches are opened again, appropriate high-side switches (e.g., $Q_{A0}$ and $Q_6$ in FIG. 2B and $Q_5$ and $Q_{B0}$ in FIG. 3B) are closed to provide a current path from ground to the appropriate capacitive load (e.g., load $C_{A0}$ in FIG. 2B and load $C_{B0}$ in FIG. 3B). The collapsing magnetic field in the flyback transformer then induces a current in its secondary winding $L_S$, which delivers the energy stored in the transformer to the appropriate capacitive load.

Figure 4A:
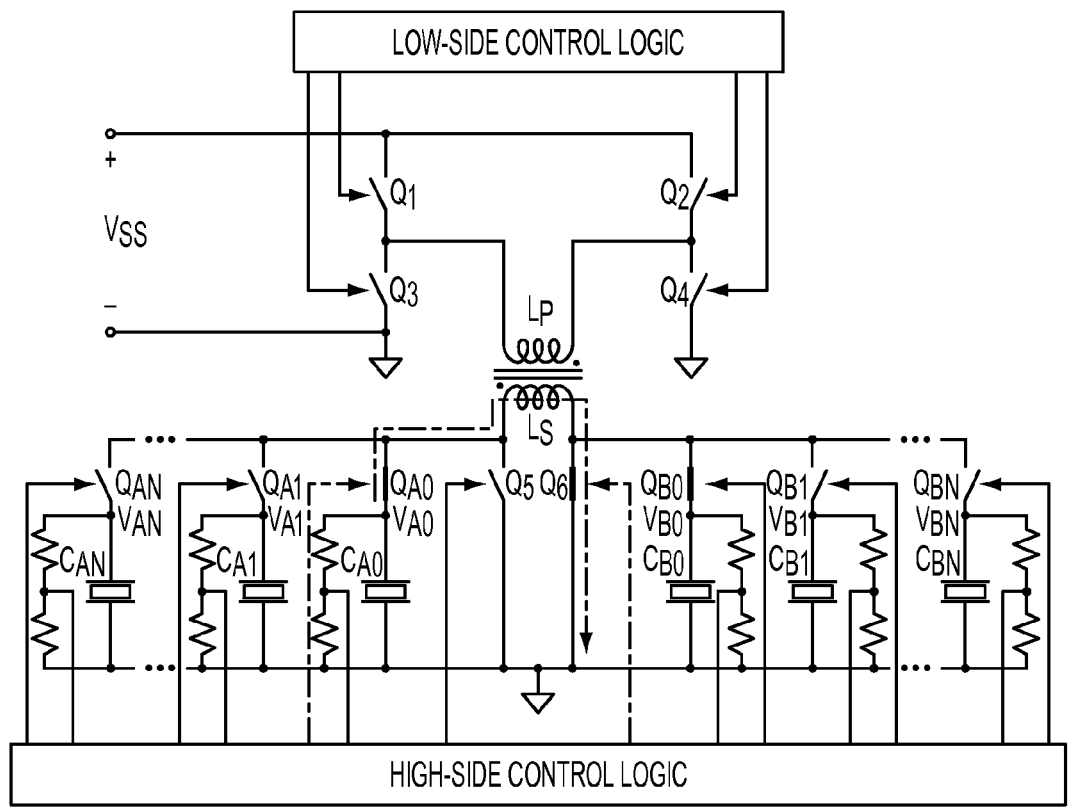
FIGS. 4A and 4B are schematic diagrams of a circuit in accordance with a preferred embodiment of the present invention illustrating transfer of energy from load $C_{A0}$ to load $C_{B1}$. Energy is stored in the flyback transformer, here acting as inductor $L_S$, by closing switches $Q_5$ and $Q_{A0}$ as shown in FIG. 4A and delivered to $C_{B1}$ by closing switches $Q_{A0}$ and $Q_{B1}$ as shown in FIG. 4B.
Figure 4B:
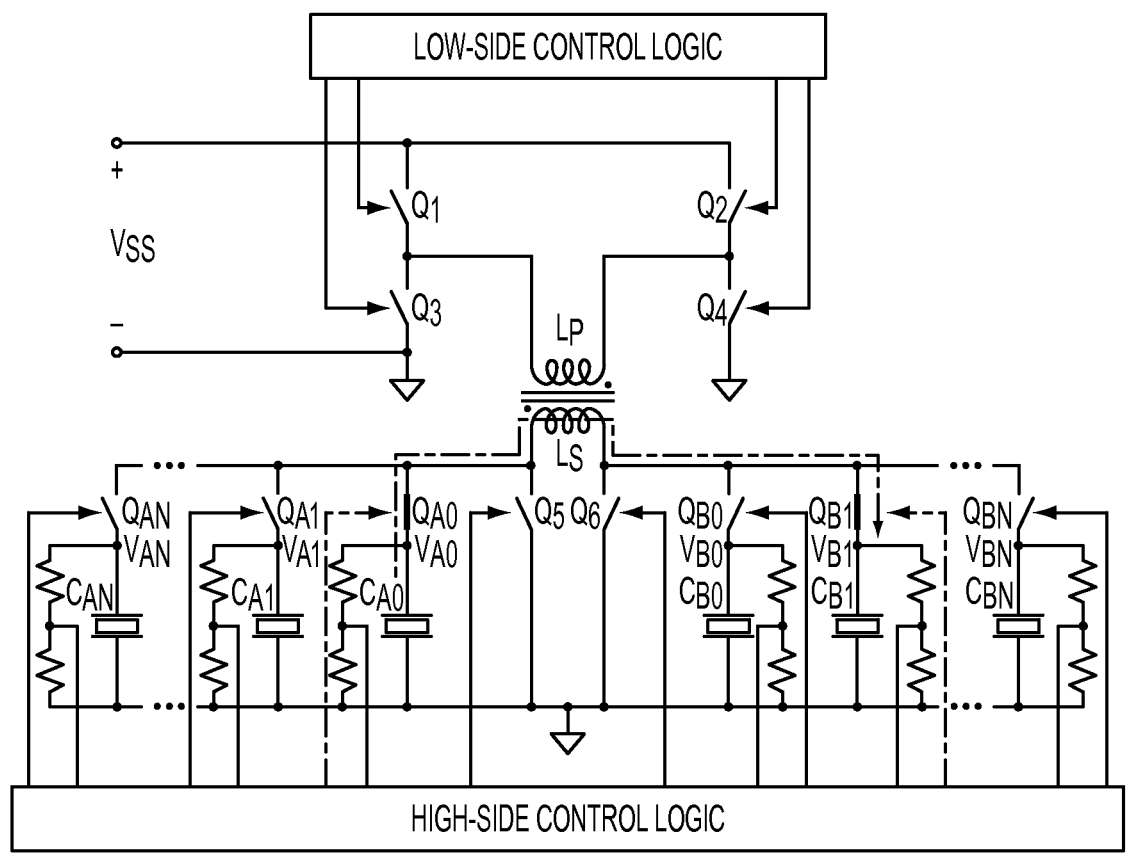
Figure 5:
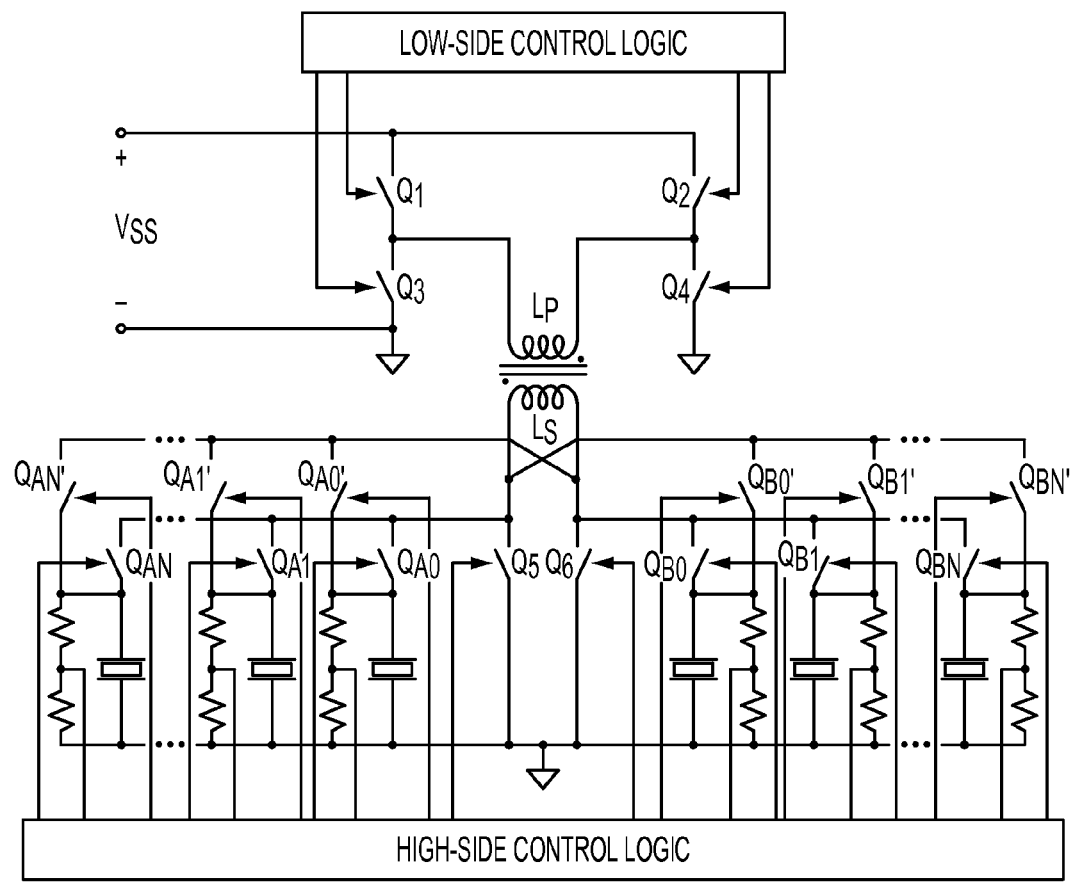
FIG. 5 is a schematic diagram of a circuit applicable to multiple cyclically driven capacitive loads in accordance with another preferred embodiment of the present invention. Here, all the capacitive loads are connected via bidirectional switches to both sides of the secondary winding $L_S$, enabling energy transfer from any capacitive load to any other capacitive load.

In the cases of energy transfer between loads $C_A$ and $C_B$, the secondary winding $L_S$ of the flyback transformer acts as an inductor. FIGS. 4A and 4B show an exemplary transfer of energy from $Q_{A0}$ to $Q_{B1}$. When transferring energy from loads $Q_{A0}$ to $Q_{B1}$, the switch $Q_6$ as well as the appropriate switch $Q_A$ are closed as shown in FIG. 4A, storing energy in the inductor. After some time, switch $Q_6$ is opened, and immediately thereafter the appropriate switch $Q_B$ is closed as shown in FIG. 4B, delivering the energy to the intended load $Q_B$. The delivery of energy ends when the appropriate switch $Q_B$ is opened again. The transfer of energy from loads $C_B$ to loads $C_A$ works in a similar fashion, but the roles of switches $Q_A$ and $Q_B$ are reversed, and switch $Q_5$ is substituted for switch $Q_6$.

By transferring known quantities of energy to and from the capacitive loads C, the drive circuit can precisely control the voltage V across each load. During normal circuit operation, the switching cycles similar to the ones shown in FIGS. 2-4 are repeated many times in order to produce the desired voltage waveforms across the loads C. For example, in order to generate a single period of a sinusoidal drive signal cross load $C_{A0}$, the drive circuit may undergo tens to tens of thousands of switching cycles, which may involve energy transfers from power supply as in FIGS. 2A and 2B, as well as energy transfers to and from loads $C_{B0}$ through $C_{BN}$, such as the one shown in FIGS. 4A and 4B.

In order to generate appropriate timing signals to modulate the switches on both the low-voltage and high-voltage sides, an analog-to-digital converter (ADC) can be used to sample the voltages across the capacitive loads C through resistive dividers, as in FIGS. 1-6. Because the electrical parameters of the capacitive loads and all the circuit components are known, it is possible to use standard circuit theory to compute in advance the lengths of time for which certain switches must be closed to transfer the desired quantity of energy to or from a specific load, for any combination of load voltage sampled by the ADC and the desired (future) value of this voltage. These pre-computed values can be stored in an electronic lookup table and retrieved using the ADC result and a digital value corresponding to the desired load voltage. This method is described in more detail in H. Janocha and C. Stiebel, "New approach to a switching amplifier for piezoelectric actuators," in *Actuator* 98. 1998, pp. 189-192 and M. Karpelson, G.-Y Wei, and R. J. Wood, "Milligram-scale high-voltage power electronics for piezoelectric microrobots," in *IEEE Int'l Conf. on Robotics and Automation,* 2009, pp. 883-890, and does not constitute a part of the present invention.

The drive circuit is particularly advantageous in cases where capacitive loads are driven 180 degrees out of phase, such as in the case of piezoelectric bimorph actuators and many antagonistic actuator configurations. For each pair of out-of-phase loads, the first is connected to one of the switches $Q_A$ and the second to one of the switches $Q_B$. In cases where the loads have different phase offsets or must be driven with different voltage waveforms, energy storage capacitors may be used as one of the loads $C_A$ or $C_B$ to hold the energy recovered from a particular capacitive load if there is no other load ready to accept this energy; the stored energy can then be transferred to another load when it is needed.

In systems with large numbers of capacitive loads operating at different phases and drive voltage waveforms, it can be difficult to determine the optimal way to connect the loads in such a way as to minimize unnecessary energy transfer and reduce the reliance on energy storage capacitors. By introducing additional components to the circuit of FIG. 1, this problem can be greatly simplified.

In the circuit of FIG. 1, each load C can be connected to only one side of the flyback transformer secondary winding $L_S$, by closing associated switch Q. Introducing additional switches, wherein each load C can be connected, by means of two independent switches (Q and Q'), to either side of the winding $L_S$, as in FIG. 5, makes it possible to transfer energy from any load C to any other load directly; as a result, it is no longer necessary to decide in advance whether a load should be part of the set $C_A$ or the set $C_B$.

Figure 6:
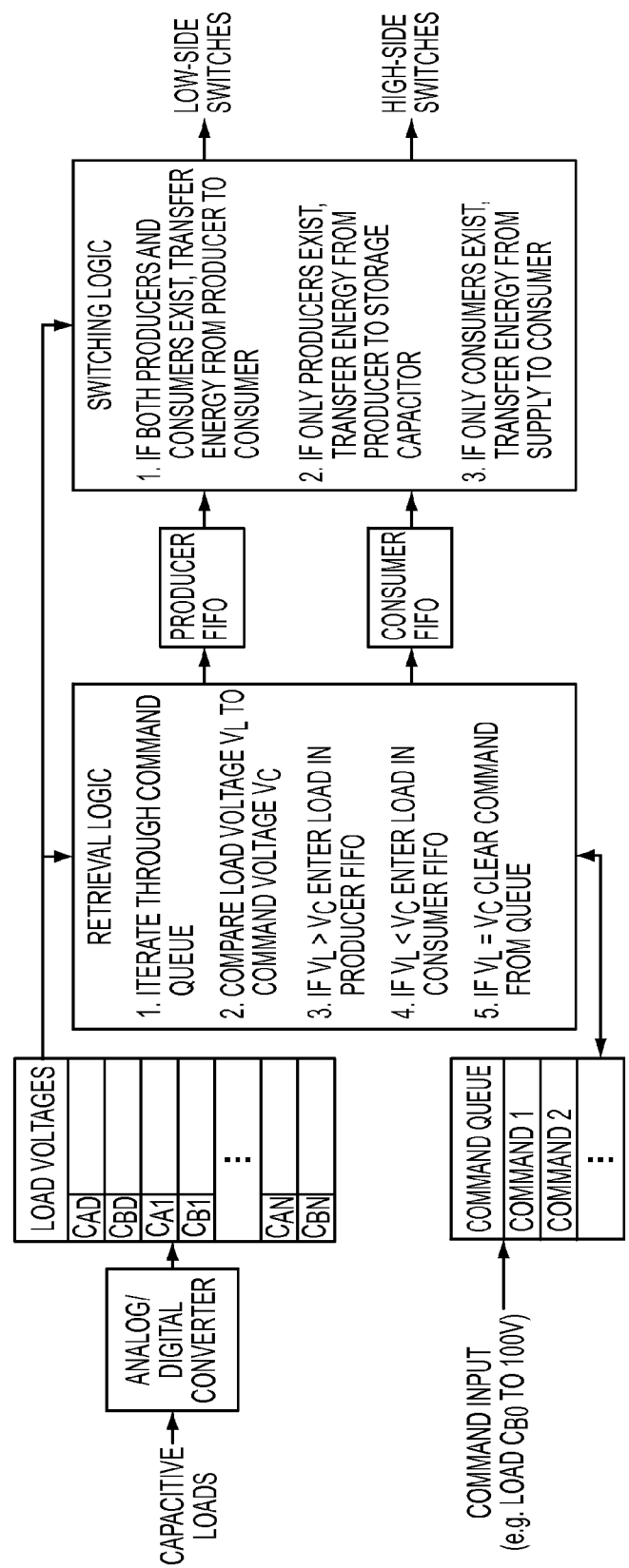
FIG. 6 is a schematic diagram of a control architecture that may be used to implement a method of generating multiple drive voltages having different phases and waveforms across multiple capacitive loads.

As described in the previous section, the control logic samples the voltages across the loads using an ADC and resistive dividers. In another preferred embodiment, the control logic can be enhanced as follows: after sampling the voltages across the loads and prior to initiating an energy transfer, the control logic identifies the loads that require energy (termed consumers) and the loads that are available for energy recovery (termed producers). The consumers and producers enter separate first-in-first-out (FIFO) queues. In subsequent switching cycles, energy is transferred from producer to consumer, one at a time, until one of the queues is empty. At that point, if there are entries remaining in the producer queue, the energy is channeled to a storage capacitor. If there are entries remaining in the consumer queue, energy is transferred from the power supply $V_{ss}$ until there are no pending consumers. ADC samples can continue to be read during these switching cycles from loads not immediately involved in energy transfer, so that the control logic remains aware of the state of the system and can refill the producer and consumer queues as necessary. FIG. 6 shows a simplified block diagram and operating algorithms of the associated control architecture. An ADC 610 samples the capacitive load voltages $V_L$ and the samples are stored in memory 620. Command inputs, which instruct a particular capacitive load to be driven to the command voltage $V_C$, are stored in the command queue 630. To generate a particular voltage waveform across a particular capacitive load, a series of command inputs are issued at discrete time intervals to provide a piecewise approximation of the particular waveform. Retrieval logic 640 iterates through entries in the command queue and determines whether the capacitive load specified in each command input is a producer or a consumer based on the current voltage across the capacitive load. The retrieval logic 640 then enters the capacitive load in the appropriate FIFO queue 650, 660. When both FIFO queues 650, 660 have entries, the switching logic 670 transfers energy from the producer at the output of the producer queue 650 to the consumer at the output of the consumer queue 660. When a producing or consuming capacitive load has reached the voltage specified by its associated command input, it is removed from the FIFO queue 650, 660 where it resides, and the next load in the queue takes its place. When only producers are available, energy is transferred to a storage capacitor. When only consumers are available, energy is transferred from the supply $V_{ss}$ to the consumers.

This variation on the invention inherently makes the drive circuit more flexible, minimizes unnecessary transfer of energy, and consequently minimizes reliance on energy storage capacitors.

The foregoing description of the preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents. The entirety of each of the aforementioned documents is incorporated by reference herein.

What is claimed is:

1. A circuit for driving a plurality of capacitive actuators, comprising:
   a low-voltage side comprising:
      first and second pairs of low-side switches, said first pair of comprising switches $Q_1$ and $Q_3$ connected in series across said input voltage and said second pair comprising switches $Q_2$ and $Q_4$ connected in series across said input voltage;
      low-side control logic connected to said low-side switches $Q_1$, $Q_2$, $Q_3$ and $Q_4$ for controlling said low-side switches $Q_1$, $Q_2$, $Q_3$ and $Q_4$; and
      a flyback transformer having a primary winding connected on a first end between said switches $Q_1$ and $Q_3$ and connected on a second end between said switches $Q_2$ and $Q_4$;
   a high-voltage side comprising:
      a switch $Q_5$ connected between a first end of a secondary winding of said flyback transformer and a ground;
      a capacitive load $C_{A0}$;
      a bidirectional switch $Q_{A0}$ connected in series with said capacitive load $C_{A0}$, wherein when said bidirectional switch $Q_{A0}$ is closed said capacitive load $C_{A0}$ is connected between said first end of said secondary winding of said flyback transformer and a ground;
      a switch $Q_6$ connected between a second end of a secondary winding of said flyback transformer and a ground;
      a capacitive load $C_{B0}$; and
      a bidirectional switch $Q_{B0}$ connected in series with said capacitive load $C_{B0}$, wherein when said bidirectional switch $Q_{B0}$ is closed said capacitive load $C_{B0}$ is connected between said second end of said secondary winding of said flyback transformer and a ground;
      high-side control logic connected to said switches $Q_5$, $Q_6$, $Q_{A0}$ and $Q_{B0}$ for controlling said switches $Q_5$, $Q_6$, $Q_{A0}$ and $Q_{B0}$.

2. A circuit according to claim 1, further comprising a resistive divider associated with each capacitive load to permit said high side control logic to monitor voltages across said capacitive loads.

3. A circuit according to claim 1, said high-voltage side further comprising:
   a plurality of capacitive loads $C_{A1}$ through $C_{AN}$ and bidirectional switches $Q_{A1}$ through $Q_{AN}$, connected in the same manner as $C_{A0}$ and $Q_{A0}$; and a plurality of capacitive loads $C_{B1}$ through $C_{BN}$ and bidirectional switches $Q_{B1}$ through $Q_{BN}$, connected in the same manner as $C_{B0}$ and $Q_{B0}$;

wherein said switches $Q_{A0}$ through $Q_{AN}$ and $Q_{B0}$ through $Q_{BN}$ are controlled by said high-side control logic.

4. A circuit according to claim 3, wherein said high-voltage side further comprises:
   a bidirectional switch $Q_{A0'}$ connected in series with said capacitive load $C_{A0}$, wherein when said bidirectional switch $Q_{A0'}$ is closed said capacitive load $C_{A0}$ is connected between said second end of said secondary winding of said flyback transformer and a ground;
   a bidirectional switch $Q_{B0'}$ connected in series with said capacitive load $C_{B0}$, wherein when said bidirectional switch $Q_{B0'}$ is closed said capacitive load $C_{B0}$ is connected between said first end of said secondary winding of said flyback transformer and a ground;
   a plurality of bidirectional switches $Q_{A1'}$ through $Q_{AN'}$, connected in the same manner as $Q_{A0'}$; and
   a plurality of bidirectional switches $Q_{B1'}$ through $Q_{BN'}$, connected in the same manner as $Q_{B0'}$;
   wherein said switches $Q_{A0'}$ through $Q_{AN'}$ and $Q_{B0'}$ through $Q_{BN'}$ are controlled by said high-side control logic.

5. A circuit according to claim 2, said high-voltage side further comprising:
   a plurality of capacitive loads $C_{A1}$ through $C_{AN}$ and bidirectional switches $Q_{A1}$ through $Q_{AN}$, connected in the same manner as $C_{A0}$ and $Q_{A0}$; and
   a plurality of capacitive loads $C_{B1}$ through $C_{BN}$ and bidirectional switches $Q_{B1}$ through $Q_{BN}$, connected in the same manner as $C_{B0}$ and $Q_{B0}$;
   wherein said switches $Q_{A0}$ through $Q_{AN}$ and $Q_{B0}$ through $Q_{BN}$ are controlled by said high-side control logic.

6. A circuit according to claim 5, wherein said high-voltage side further comprises:
   a bidirectional switch $Q_{A0'}$ connected in series with said capacitive load $C_{A0}$, wherein when said bidirectional switch $Q_{A0'}$ is closed said capacitive load $C_{A0}$ is connected between said second end of said secondary winding of said flyback transformer and a ground;
   a bidirectional switch $Q_{B0'}$ connected in series with said capacitive load $C_{B0}$, wherein when said bidirectional switch $Q_{B0'}$ is closed said capacitive load $C_{B0}$ is connected between said first end of said secondary winding of said flyback transformer and a ground;
   a plurality of bidirectional switches $Q_{A1'}$ through $Q_{AN'}$, connected in the same manner as $Q_{A0'}$; and
   a plurality of bidirectional switches $Q_{B1'}$ through $Q_{BN'}$, connected in the same manner as $Q_{B0'}$;
   wherein said switches $Q_{A0'}$ through $Q_{AN'}$ and $Q_{B0'}$ through $Q_{BN'}$ are controlled by said high-side control logic.

7. A method for driving multiple capacitive actuators comprising the steps of:
   applying a first voltage $V_{ss}$ across a primary winding of a flyback transformer to store a quantity of energy in a magnetic field of said flyback transformer;
   disconnecting said first voltage $V_{ss}$ from said primary winding of said flyback transformer;
   providing a current path from ground to a first capacitive load through the secondary winding of said flyback transformer;
   delivering energy from said secondary winding of said flyback transformer to said first capacitive load;
   transferring energy from said first capacitive load to said flyback transformer via the secondary winding of said flyback transformer;
   providing a current path from ground to a second capacitive load through said secondary winding of said flyback transformer;
   delivering energy from said secondary winding of said flyback transformer to said second capacitive load; and
   repeating the above steps in an appropriate sequence to generate arbitrary voltages that can be substantially higher than said first voltage $V_{ss}$ across said first capacitive load, said second capacitive load, and multiple other capacitive loads as required by the application.

8. The method according to claim 7, wherein low-side control logic and high-side control logic generate drive voltages having different phases and waveforms across multiple capacitive loads by repeating the following steps:
   monitoring voltages across said multiple capacitive loads;
   tracking command inputs that instruct certain capacitive loads to be driven to certain voltages, as required by system operation;
   using a first first-in-first-out (FIFO) memory element to record capacitive loads where the voltage must be reduced;
   using a second FIFO memory element to record capacitive loads where the voltage must be increased;
   initiating an energy transfer from the capacitive load recorded on the output of said first FIFO memory element to a capacitive load recorded on an output of said second FIFO memory element;
   removing a record of a capacitive load from the FIFO queue where it is stored once said capacitive load has reached the voltage indicated by the command input;
   initiating an energy transfer from the capacitive load recorded on the output of said first FIFO memory element to an energy storage capacitor when said second FIFO memory element does not contain any entries, and subsequently removing the record of said capacitive load from said first FIFO memory element;
   initiating an energy transfer from said energy storage capacitor to the capacitive load recorded on the output of said second FIFO memory element when said first FIFO memory element does not contain any entries, and subsequently removing the record of said capacitive load from said second FIFO memory element; and
   initiating an energy transfer from said input voltage $V_{ss}$ to the capacitive load recorded on the output of said second FIFO memory element when said first FIFO memory element does not contain any entries and when said energy storage capacitor does not contain any energy, and subsequently removing the record of said capacitive load from said second FIFO memory element.

* * * * *